United States Patent [19]

Taylor

[11] 4,051,397
[45] Sept. 27, 1977

[54] TWO SENSITIVITY LEVEL KINETIC SENSOR

[75] Inventor: Allen L. Taylor, Woodbury, Minn.

[73] Assignee: Minnesota Mining and Manufacturing Company, St. Paul, Minn.

[21] Appl. No.: 603,156

[22] Filed: Aug. 8, 1975

[51] Int. Cl.² ............................................. H01L 41/04
[52] U.S. Cl. ...................................... 310/351; 310/363
[58] Field of Search ............... 310/8.2, 8.3, 8.4, 8.5, 310/8.6, 9.1, 9.4; 73/DIG. 4, 517 AV, 88.5 R, 67, 71; 340/261, 262, 280, 283

[56] References Cited

U.S. PATENT DOCUMENTS

| 3,186,234 | 6/1965 | Forrest | 310/8.4 X |
|---|---|---|---|
| 3,371,234 | 2/1968 | Cady | 310/8.4 X |
| 3,432,843 | 3/1969 | Spring | 340/283 |
| 3,611,345 | 10/1971 | Pintell | 340/280 |
| 3,631,271 | 12/1971 | Shimada | 310/8.1 |
| 3,710,371 | 6/1973 | Whalen | 340/283 |

*Primary Examiner*—Mark O. Budd
*Attorney, Agent, or Firm*—Cruzan Alexander; Donald M. Sell; Walter N. Kirn

[57] ABSTRACT

A two sensitivity level detector for sensing motion of an object on which the detector is placed. The detector includes a sensing unit that responds to movement of the object by supplying electrical current to sensing circuitry adapted to provide an indication of movement upon receipt of such current. The housing of the detector is formed with at least one exterior planar surface and at least one spherical surface so that detector movement in response to movement of the object is dependent upon whether the detector has its planar or spherical surface in contact with the object.

4 Claims, 3 Drawing Figures

TWO SENSITIVITY LEVEL KINETIC SENSOR

BACKGROUND OF THE INVENTION

1. Field of the Invention

The present invention relates in general to detectors for sensing motion of an object and more specifically to such detectors that have a variable sensitivity.

2. Description of the Prior Art

Various devices that react to motion are known in the art as exemplified by U.S. Pat. No. B. 3,456,134 to Ko, disclosing an energy unit that responds to motion by supplying electrical power to biological implants such as heart pacemakers. However, the device of the Ko patent is not adapted for indicating motion of an object on which it is placed, and accordingly, does not teach in any way a motion detector having a variable sensitivity of operation.

SUMMARY OF THE INVENTION

The present invention provides a two sensitivity level detector for sensing motion of an object and having a sensing unit and sensing circuitry disposed inside the detector housing for indicating movement of the object. The detector housing includes at least one planar surface and at least one curved surface to provide the two sensitivity level operation of the detector.

In a preferred embodiment the housing of the detector has a disk-like bottom portion and a spherical upper portion jointed together to form a closed housing. The sensing unit of the detector is formed from a strip of poled, piezoelectric material that is coated on its planar surfaces with conductive layers and is fixed by one end in a perpendicular relationship to the lower disk-like portion of the housing. The other end of the sensing unit is permitted to freely vibrate in response to motion of the detector and a small weight is attached near the vibrating free end to accentuate such vibration. When the detector is placed on an object with its planar surface contacting same, the detector will move only in direct correspondence to movement of the object on which it is placed and thereby operates in a low sensitivity mode. However, if the detector is placed on the object with the curved surface contacting same, movement of the object will produce rocking of the detector and provide high sensitivity detection.

DESCRIPTION OF THE PREFERRED EMBODIMENTS

Figure 1:
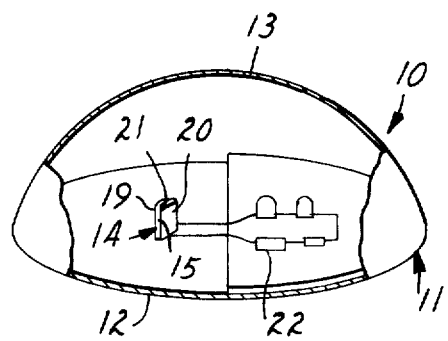
FIG. 1 is a perspective view of a first preferred embodiment of the present invention that includes a housing with portions cut away to expose a sensing unit and sensing circuitry disposed therein.
Figure 2:
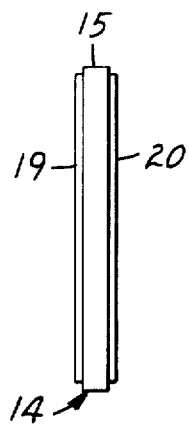
FIG. 2 is an enlarged side view of the sensing unit of FIG. 1.

Referring now to the drawings and with reference first to FIG. 1, a motion detector 10 that forms a preferred embodiment of the present invention is shown. The detector 10 is adapted to be manufactured in minature size so that it can be placed on a wide variety of items to indicate whether or not such items are being moved.

The detector 10 includes a housing 11 preferably having a circular disk-like lower portion 12 and a spherical upper portion 13 that are joined together to formed a closed housing. Although such configuration of housing is preferred, other housing configurations may be employed so long as they have at least one planar surface and one curved surface.

Disposed in the housing 11 is a readily bendable sensing unit 14 that is fixed at one end to the lower housing portion 12 to reside in a perpendicular relationship to the lower portion 12 so that its unattached or free end is permitted freedom of movement and will thereby vibrate in response to motion of the detector 10. The sensing unit 14 includes a thin strip 15 of poled, polymeric piezoelectric insulative material vapor coated with conductive layers 19 and 20 on its planar surfaces that serve as conductive electrodes. Preferably the strip 15 is formed from polyvinylidene fluoride and the conductive layers 19 and 20 are formed from either aluminum, nickel, copper or the like.

A small weight 21 is mounted near the free end of the sensing unit 14 and is sufficiently heavy to provide an inertial mass that accentuates bending of the sensing unit 14 when the detector 10 is moved. Preferably the weight 21 is mounted on the outer end of the sensing unit 14 so that it has the greatest mechanical advantage for producing sensing unit bending. When the detector 10 is moved, considerable vibration of the sensing unit 14 results and because of the piezoelectric property of the strip 15 electrostatic charges of opposite polarities accumulate on the conductive electrodes 19 and 20.

Figure 3:
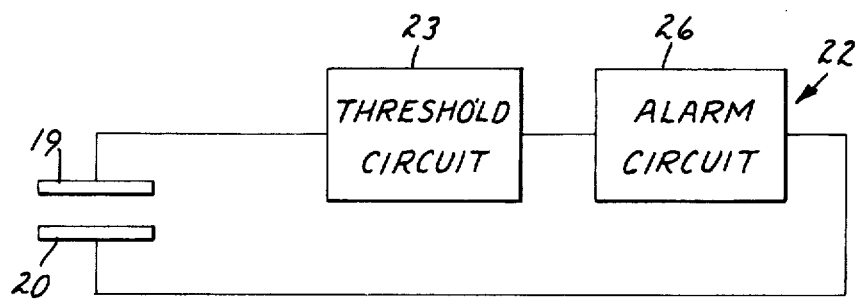
FIG. 3 is a block diagram of electronic circuitry connected to the sensing unit of FIG. 2.

Referring now to FIG. 3, sensing circuit 22 that is connected across the conductive electrodes 19 and 20 of the sensing unit 14 is shown. The sensing circuitry 22 may include a wide variety of standard components for detecting electrostatic charges that accumulate on the conductive electrodes 19 and 20 and providing a detection signal in response to such charges. Preferably, the circuitry 22 includes a threshhold circuit 23 that is supplied with electrostatic charges from the conductive electrodes 19 and 20. The output of the threshhold circuit 23 is connected to an alarm circuit 26 that can be variably adjusted in order that it can be set to provide an output only upon receiving a desired level of charge from the conductive electrodes 19 and 20. In this way the sensitivity of the detector 10 can be electronically regulated. The use of the threshhold circuit 23 is particularly advantageous in the present invention because the sensing unit 14 is sufficiently resilient that it will vibrate in response to small movements of the detector 10 and accordingly, the detector 10 can be made extremely sensitive.

The variable sensitivity afforded by employment of the threshhold circuit 23 permits one to make small scale adjustments in the sensitivity sensing operation of the detector 10. The physical configuration of the detector housing 11 serves the function of changing the sensitivity of the detector 10 on a large scale, which sensitivity variation is dependent on whether the detector 10 is placed on an object with its planar bottom housing portion 12 contacting the object or with its spherical upper housing portion 13 contacting the object. As may readily be perceived, if the spherical upper portion 13 of the detector housing 11 contacts the object, the detector 10 will be highly susceptible to movement of the object because such movement will cause the detector 10 to rock back and forth and correspondingly produce substantial vibration of the sensing unit 14 due to such movement. However, if the detector 10 is placed with its planar bottom housing portion 12 adjacent the object, motion of the detector 10 and vibration of the sensing unit 14 will substantially correspond solely to movement of the object.

Thus, the detector 10 provides a relatively simplistic means for detecting movement of an object and can readily be adapted to provide large and small scale sensitivity sensing operation in order that the detector may be employed with objects that are exposed to severe motion as well as objects that are exposed to minimal motion. Furthermore, the use of the threshhold circuit 23 permits the sensitivity of the detector 10 to be finitely adjusted to correspond to the particular type motion desired to be detected.

What is claimed is:

1. A motion detector providing a large or small scale sensitivity sensing operation depending upon the configuration of the surface constituting the base of the detector, said detector comprising:
    a housing means having a first surface configured to provide a planar base and a first sensitivity for said detector and a second surface configured to provide a curved base and a second sensitivity greater than said first sensitivity for said detector,
    sensing means disposed within and operatively associated with said housing means, said sensing means including piezoelectric means responsive to movement of said detector to provide an electrical current having a first magnitude when said detector is supported on said planar base and a second magnitude larger than said first magnitude when said detector is supported on said curved base, and
    electrical circuit means disposed within said housing means in electrical association with said sensing means to receive said electrical current provided by said sensing means, said electrical circuit means including signal means energizable to provide a detectable signal in response to movement of said detector.

2. The detector of claim 1 wherein said piezoelectric means is provided in the form of a layer having conductive electrodes on opposing major surfaces of said layer, said sensing means being fixedly mounted at one end and at an opposite end being free to vibrate in response to movement of said detector.

3. The detector of claim 2 wherein said sensing means includes a weight mounted thereon to serve as an inertial mass that accentuates vibration of said sensing means.

4. The detector of claim 1 wherein said piezoelectric means is formed from polyvinylidene flouride.

* * * * *